3,351,617
Patented Nov. 7, 1967

3,351,617
POLYMERIZABLE MONOMERS CONTAINING PHOSPHORUS AND PROCESS FOR THEIR MANUFACTURE
Horst Jaeger, Bettingen, Hermann Nachbur, Riehen, and Arthur Maeder, Therwil, Switzerland, assignors to Ciba Limited, Basel, Switzerland, a Swiss company
No Drawing. Filed Sept. 9, 1964, Ser. No. 395,279
Claims priority, application Switzerland, Sept. 18, 1963, 11,513/63
6 Claims. (Cl. 260—78.5)

The present invention relates to the manufacture of polymerisable monomers containing phosphorus and corresponding to the general formula
(1)

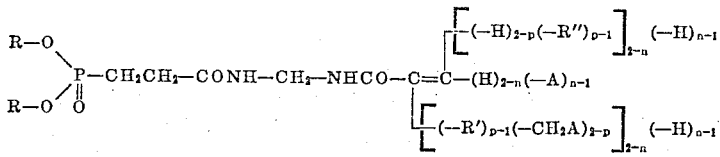

where A represents

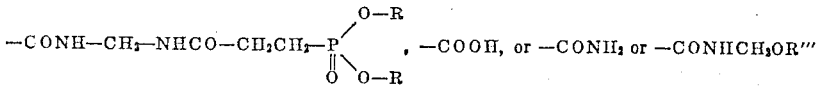, —COOH, or —CONH$_2$ or —CONHCH$_2$OR'''

R represents an alkyl radical containing 1 to 18 carbon atoms, a cycloalkyl or aryl radical; R' and R'' each represents a hydrogen atom or methyl group, R''' represents hydrogen or an alkyl group with 1 to 4 carbon atoms and $n$ and $p$ each is 1 or 2.

The compounds of the Formula 1 are derived from α,β-ethylenically unsaturated amides of monocarboxylic or dicarboxylic acids containing 3 to 5 carbon atoms. When $n$ and $p$ in the Formula 1 are equal to 1, the compounds are derived from itaconic acid, while when $n=1$ and $p=2$, the compounds concerned are predominantly derived from acrylic, methacrylic or crotonic acid. When $n=2$, compounds of maleic or fumaric acid are concerned. Preferably, $n=1$, $p=2$ and R' is a hydrogen atom or a methyl group and R'' represents hydrogen. When R''' is an alkyl radical, it is preferably a methyl radical.

To obtain the compounds of the Formula 1

(a) an N-methylolamide of an α,β-unsaturated monocarboxylic or dicarboxylic acid is reacted with a β-[dialkyl-, -cycloalkyl- or -arylphosphono]-propionamide, accompanied by elimination of water; or
(b) an amide of an α,β-unsaturated monocaboxylic or dicarboxylic acid is reacted with a β-[dialkyl, -cycloalkyl- or -arylphosphono]-N-methylolpropionamide, accompanied by elimination of water; or
(c) an amide (substituted on the amide nitrogen atom by N - methylene - β-chloropropionamide) of an α,β-unsaturated monocarboxylic or dicarboxylic acid is reacted with a dialkyl phosphite, dicycloalkyl phosphite or diaryl phosphite.

The compound of the Formula 1 is advantageously manufactured according to a, that is to say by condensing the N-methylolamide with the phosphono-propionamide compound. In the case of N-methylolacrylamide and β-[dimethylphosphono]-propionamide the reaction is performed as defined by the Equation a:

(a) CH$_2$=CHCONHCH$_2$OH +
N-methylolacrylamide

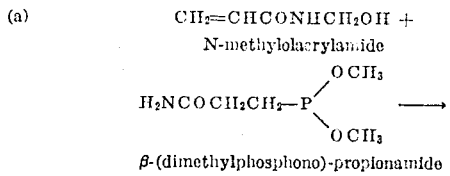
β-(dimethylphosphono)-propionamide

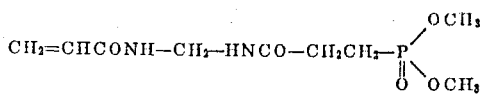

Methylene - N - acrylamide-N'-β-(dimethylphosphono)-propionamide.

The corresponding reaction equations for methods b and c are as follows:

(b)

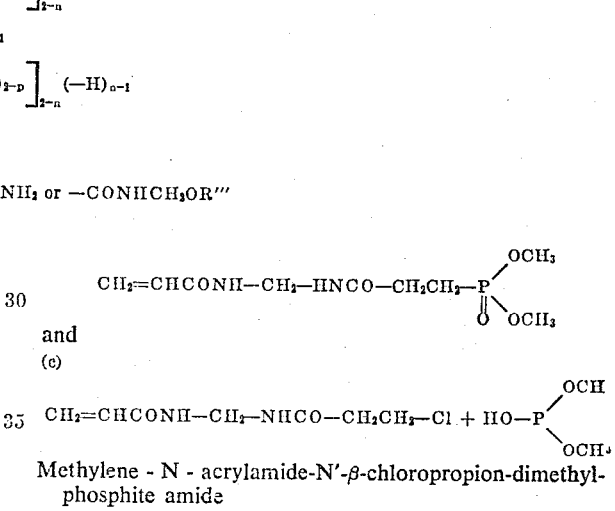

Methylene - N - acrylamide-N'-β-chloropropion-dimethylphosphite amide

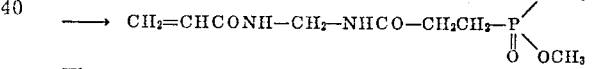

The condensation according to a and b is advantageously carried out in an aqueous solution at a pH ranging from 0 to 6.5, preferably from 1 to 3, and at a temperature from 20 to 70° C., preferably from 40° to 60° C. The content of the final product in the aqueous solution is 5 to 95%. To obtain the condensation product, the water may be removed by azeotropic distillation. The addition reaction of dimethylphosphite with methylene-N-acrylamide-N'-β-chloropropionamide according to Equation c is advantageously carried out in the presence of an acid acceptor.

The β-[dimethylphosphono]-propionamide of Equation a, used as starting material, and the β-[dimethylphosphono] - N - methylolpropionamide of Equation b can be manufactured by adding dimethylphosphite on to acrylamide or N-methylolacrylamide. The methylene-N-acrylamide-N'-β-chloropropionamide of Equation c is manufactured in the known manner by condensing N-methylolacrylamide and β-chloropropionamide.

The monomers of the Formula 1 can be homopolymerised in solution or in emulsion and in the presence of a catalyst that furnishes free radicals or of an ionic catalyst, or copolymerised with another compound of the Formula 1, or with other polymerisable compounds, to form linear polymers of high molecular weight. Depending on the starting materials chosen this polymerisation yields linear polymer homologues, unitary polymers or linear multipolymers. Polymer homologues are obtained when using only identical monomer units, while unitary polymers are obtained when using two or more monomeric units all of which correspond to the Formula 1, and multipolymers are obtained when using at least one monomeric unit of the general Formula 1 and at least one other polymerisable monomeric unit; compare "Die Makromolekulare Chemie" 38, page 2 et. seq. [1960].

Monomers suitable for the manufacture of multipolymers are:

(a) vinyl esters of organic acids, for example vinyl acetate, vinyl formate, vinyl butyrate or vinyl benzoate,
(b) vinylalkyl ketones, such as vinylmethyl ketone,
(c) vinyl halides, such as vinyl chloride, vinyl fluoride or vinylidene chloride,
(d) vinylaryl compounds, such as styrene and substituted styrenes,
(e) derivatives of the acrylic acid series, such as acrylonitrile or acrylic acid amide and preferably its derivatives substituted on the amide nitrogen, such as N-methylolacrylamide, N - methylolacrylamide alkyl ether, N,N-dihydroxyethylacrylamide, N-tertiary butylacrylamide and hexamethylolmelamine triacrylamide, and
(f) acids and especially esters of the crylic acid series, that is to say $\alpha,\beta$-ethylenically unsaturated monocarboxylic or dicarboxylic acids containing 3 to 5 carbon atoms, e.g. esters from acrylic acid, methacrylic acid, $\alpha$-chloracrylic acid, crotonic acid, maleic acid, fumaric acid or itaconic acid and monoalcohols or dialcohols containing 1 to 18 carbon atoms or phenols, e.g. ethylacrylate, glycidylacrylate, n-butylacrylate, acrylic acid monoglycol ester or dodecylacrylate.
(g) Furthermore, there may be used polymerisable olefins such as isobutylene, butadiene or 2-chlorobutadiene.

Preferred use is made of vinyl chloride, vinylidene chloride, acrylic, methacrylic, fumaric or itaconic acid and of their esters, such as acrylic acid ethyl ester, acrylic acid butyl ester, acrylic acid glycidyl ester, acrylic acid monoglycol ester; furthermore calcium acrylate, acrylamide, methacrylamide, N-methylolacrylamide, N-methylolacrylamide methyl ether, N-tertiary butylacrylamide, vinylacetate, acrylonitrile, styrene, vinylidene chloride or butadiene. Particularly valuable multipolymers are obtained from a monomeric unit of the Formula 1, particularly from methylene-N-acrylamide-N'-$\beta$-[dimethylphosphono] - propionamide, N - methylolacrylamide or N-methylolacrylamide methyl ether and an ester of the acrylic acid series. The high polymers consist as a rule of 5 to 100% of the compound of the general Formula 1 and 95 to 0% of another compound. Depending on the polymerisation conditions chosen the high polymers are obtained as liquids, gels, emulsions or granulates.

The high polymers of the invention contain phosphorus which enables them to be used with great advantage whenever a flame-inhibiting or biocidal effect is aimed at. The polymers may be used by themselves, in solution or in emulsion. They are suitable for the manufacture of shaped structures, of coatings on non-porous materials such as metals, glass or wood, or of impregnations or coatings on porous materials such as textiles, paper or leather. Of special value are impregnations on textile material from natural, modified or fully synthetic fibres such as cotton, viscose rayon, cellulose 2½-acetate, cellulose triacetate, polyesters, acrylonitrile or nylon fibres. The high polymers may also be used in combination with other high polymers or pre-condensation such as aminoplasts, e.g. condensation products of formaldehyde with urea, cyanamide, dicyandiamide or especially melamine.

To convert the high polymers into the insoluble state they are advantageously heated at temperatures ranging from 100 to 180° C.

A further sphere in which the new products may be used is the copolymerisation with polymerisable polyesters, for example with polyesters from maleic anhydride, phthalic anhydride and ethyleneglycol. The polyester masses cured by polymerisation display outstanding flame-inhibiting properties.

EXAMPLE 1

*Manufacture of methylene-N-acrylamide-N'-$\beta$-[dimethylphosphono]-propionamide*

(a) 4.8 mols of $\beta$-[dimethylphosphono]-propionamide are condensed with 4.8 mols of methylolacrylamide in a 77% aqueous solution. The reaction time is 4 hours, the temperature 50° C. and the pH is 3.1 to 3.6. The yield amounts to 96%.

Part of the solution is subjected to azeotropic distillation with isopropanol and yields after drying in a high vacuum a product which reveals the following analytical data:

$C_9H_{17}N_2O_5P \cdot H_2O$—Percent calculated: C, 38.50; H, 6.52; O, 34.00; N, 9.95; P, 11.0. Percent found: C, 36.85; H, 6.80; O, 34.11; N, 9.64; P, 12.60.

(b) 1 mol of $\beta$-[diethylphosphono]-N-methylolpropionamide (in the form of an 80% aqueous solution) is mixed with 1 mol of acrylamide and 200 mg. of hydroquinone. The pH is adjusted to 3 to 4 with hydrochloric acid, and the reaction solution is stirred for 4 hours at 50° C.

Part of the resulting compound is freed from water and isolated by azeotropic distillation with isopropanol and reveals the following analytical data:

$C_{11}H_{21}N_2O_5P$—P-content calculated, 10.81%; found, 10.81%.

$C_{11}H_{21}N_2O_5P \cdot H_2O$—Percent calculated: C, 42.58; H, 7.45; N, 9.0; O, 30.88; P, 10.32. Percent found: C, 42.25; H, 7.75; N, 8.31; O, 30.88; P, 10.81.

EXAMPLE 2

*Manufacture of methylene-N-itaconic acid amide-N'-$\beta$-[dimethylphosphono]-propionamide*

(a) 0.37 mol of itaconic acid-$N^1$-amide-$N^2$-methylolamide is condensed with 0.37 mol of $\beta$-dimethylphosphono-propionamide in a 40.5% aqueous solution. The reaction time is 4½ hours the temperature 50° C. and the pH is 1.0 to 1.5. The yield amounts to 94%.

Part of the solution is processed as described in Example 1 and yields a product whose analysis corresponds to the formula:

$C_{11}H_{22}N_3O_7P \cdot 2H_2O$—Percent calculated: C, 35.2; H, 6.95; N, 11.20; O, 38.4; P, 8.25. Percent found: C, 33.53; H, 6.27; N, 11.22; P, 7.81.

EXAMPLE 3

*Manufacture of methylene-N-crotonamide-N'-$\beta$-[dimethylphosphono]-propionamide*

1 mol of crotonamide is condensed with 1 mol of $\beta$-[dimethylphosphono]-propionamide in a 53% aqueous solution. The reaction time is 4 hours, the temperature 50° C. and the pH is 1.0 to 1.5. The yield amounts to 97%.

Part of the solution is subjected to azeotropic distillation wtih isopropanol and furnishes after drying in a high vacuum the desired analytically pure product $C_{10}H_{20}O_5N_2P$.

EXAMPLE 4

*Manufacture of methylene-N-methylacrylamide-N'-$\beta$-[dimethylphosphono]-propionamide*

1 mol of $\beta$-[dimethylphosphono]-propionamide is condensed with 1 mol of methylolmethacrylamide in a 60% aqueous solution. The reaction time is 4 hours, the temperature 50° C., and the pH is 1.0 to 1.8. The yield amounts to 85%. Processing as described in Example 1 furnishes a product whose analysis corresponds to the formula $C_{10}H_{19}O_5N_2P \cdot \frac{1}{2}H_2O$.

EXAMPLE 5

*Manufacture of methylene-N-furmaric acid diamide-N'-$\beta$-[dimethylphosphono]-propionamide*

0.5 mol of fumaric acid diamide is condensed with 0.5 mol of $\beta$-[dimethylphosphono]-propionic acid methylolamide in a 62% aqueous solution. To prevent the formation of two layers, 20 ml. of methanol are added. The reaction time is 4 hours, the temperature 50° C., the pH is 1.0 to 1.2 and the yield amounts to 80%.

Processing as described in Example 1 yields an analytically pure product whose phosphorus content is slightly too high, namely 14% instead of 11.6% as calculated, which suggests that a certain proportion of fumaric acid-N,N'-[dimethylene-di-β - (dimethylphosphono)propionamide]-diamide has been formed.

EXAMPLE 6

*Manufacture of methylene-N-crotonamide-N'-β-[dimethylphosphono]-α-methylpropionamide*

0.5 mol of methylolcrotonamide is condensed with 0.5 mol of β-[dimethylphosphono]-α - methylpropionamide in a 56% aqueous solution. The reaction time is 4 hours, the temperature 50° C. and the pH is 1.2 to 3.0. The yield amounts to 96%.

For polymerisation part of the aqueous solution is mixed with 0.1 g. of potassium persulfate. The reaction time is 6 hours, the temperature 60° C. and the pH is 3.0 to 4.0. A cream-colored, waxy polymer settles out from the aqueous solution.

A specimen is dried in a high vacuum at 120° C. and analysed. The combustion analysis corresponds to a monomer of the empirical formula $C_{11}H_{21}O_5N_2P$. When a specimen of the polymer is placed in the non-luminous flame of a Bunsen burner, the specimen chars without burning.

EXAMPLE 7

*Manufacture of methylene-N-maleic acid monoamide-N-β-[di-butylphosphono]-α-methylpropionamide*

0.25 mol of maleic acid monoamide is condensed with 0.25 mol of β-[dibutylphosphono]-α-methyl-methylolpropionic acid amide in a 50% aqueous solution. To prevent layer formation, 20 ml. of methanol are added. The reaction time is 4 hours, the temperature 50° C. and the pH is 1.0 to 1.3. The yield amounts to 91%.

A specimen of the product, processed as described in Example 1, yields according to analysis a compound $C_{17}H_{32}N_3O_6P \cdot 2H_2O$.

EXAMPLE 8

*Manufacture of N,N'-di[β-dibutylphosphonopropionamide-methylene]itaconic acid diamide*

0.15 mol of itaconic acid dimethylol-diamide is condensed with 0.30 mol of β-[dibutylphosphono]propionamide in a 33% aqueous methanolic solution. The reaction time is 4 hours, the temperature 50° C. and the pH is 1.0 to 1.3. The yield amounts to 87%.

Isolated crystals decompose at 330° C. Hydrogenation causes formation of 100% of double bonds. The combustion analysis corresponds with the formula $$C_{29}H_{56}N_4O_{10}P_2 \cdot H_2O$$

Methylene-N-acrylamide-N' - β - [dilaurylphosphono]-propionamide and methylene - N - acrylamide-N' - β - [distearylphosphono]-propionamide can be prepared by condensing methylolacrylamide with the corresponding phosphonopropionamides in benzene, in a yield of about 20%.

EXAMPLE 9

86.0 parts of a 78% aqueous solution of

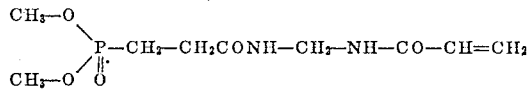

(prepared as described in Example 1) are mixed with 240 parts of deionised water and 64 parts of absolute ethanol and heated to 60° C. under nitrogen in a 500 ml. stirring flask.

The stirring flask is equipped with a reflux condenser and a thermometer. At 60° C. a solution of 0.15 part of potassium persulfate in 3 parts of water is added, whereupon polymerisation sets in spontaneously, as is revealed by a slight rise in temperature and a distinct increase in viscosity. After about one hour another solution of 0.15 part of potassium persulfate in 3 parts of water is added and polymerisation is continued for one hour at about 70° C.

Yield: 270 parts of a viscous, colorless solution which contains 18.3% of resin.

215 parts of the aqueous resin solution of about 18% strength are diluted with 215 parts of water, and 67.5 parts of hexamethylolmelamine pentamethyl ether and 2.5 parts of ammonium chloride are added. A cotton fabric and a spun rayon fabric are padded twice with intermediate drying and finally cured for 5 minutes at 160° C.

The cotton fabric does not burn, whereas the spun rayon fabric burns for a short time and then extinguishes itself. A polyester fabric impregnated in identical manner is dried on a tenter at 80° C. and cured at 150 to 160° C. After having been washed three times (3×SNV-3) the fabric does not burn.

EXAMPLE 10

The following compounds are polymerised:

Percent (a)
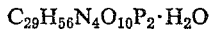 48

(b) N-methylolacrylamide _____ 20
(c) Vinylidenechloride _____ 20
(d) n-Butylacrylate _____ 10
(e) Ca-acrylate _____ 2

(A) In a 500 ml. stirring flask equipped with reflux condenser, thermometer and supply vessel 0.18 part of sodium laurylsulfate are dissolved in 84 parts of deionised water and there are then added:

0.7 part of an aqueous calcium acrylate solution of 25.3% by weight strength,
0.18 part of carbon tetrachloride,
0.9 part of n-butylacrylate,
1.8 parts of vinylidenechloride,
3.0 parts of an aqueous solution of 60% by weight strength of N-methylolacrylateamide and
5.5 parts of an aqueous solution of 78% by weight strength of methylene-N-acrylamide-N' - β - [dimethylphosphono]-propionamide.

The stirring vessel is scavenged with nitrogen and the mixture is heated to an internal temperature of 60° C. while being stirred.

(B) The supply vessel is charged with a mixture prepared as follows: A solution of 0.72 part of sodium laurylsulfate in 84 parts of deionised water is mixed with 6.4 parts of an aqueous solution of calcium acrylate 25.3% by weight strength,
0.72 part of carbon tetrachloride,
8.1 parts of n-butylacrylate,
16.2 parts of viylidenechloride,
27.0 parts of an aqueous solution of 60% by weight strength of N-methylolacryamide and
50.0 parts of an aqueous solution of 78% by weight strength of methylene - N - acrylamide-N-β-[dimethylphosphono]-propionamide.

To this mixture there is then added a solution of 0.18 part of potassium persulfate in 3.5 parts of water. The mixture (A) is likewise mixed with a solution of 0.18 part of potassium persulfate in 3.6 parts of water and with a solution of 0.09 part of sodium bisulfite in 1 part of water, and the mixture (B) is begun to be run in when polymerisation has set in (as is revealed by a slight rise in temperature). When all has been run in, another solution of 0.09 part of potassium persulfate in 1.8 parts of water is added and the polymerisation is finalised at about 70° C. during another 2 hours.

There are obtained 296 parts of a thinly liquid emulsion which has a dry content of 28.1% and a pH value of 4.7. The polymer yield amounts to about 91% of the theoretical.

5 g. of ammonium chloride per liter of the emulsion described above are then added, and the mixture is used to pad a cotton fabric No. 90 which is then squeezed to a weight increase of 90%. The fabric is dried on a tenter at 80° C. and cured for 4½ minutes at 150° to 160° C. The finished fabric has a good flame-inhibiting effect, since after a short time the flame goes out by itself.

EXAMPLE 11

(a)

$$CH_3O\diagdown\atop CH_3O\diagup P-CH_2-CH_2-CONH-CH_2-NH-CO-CH=CH_2$$  ... 40 Percent (b) N-methylolacrylamide _____ 30
(c) Vinylidenechloride _____ 18
(d) n-Butylacrylate _____ 10
(e) Ca-acrylate _____ 2 are polymerised.

To a solution of 0.9 part of sodium laurylsulfate in 153.6 parts of deionised water there are successively added:

0.9 part of carbon tetrachloride,
7.1 parts of an aqueous calcium acrylate solution of 25.3% by weight strength,
9.0 parts of n-butylacrylate,
16.2 of vinylidenechloride,
45.0 parts of an aqueous solution of 60% by weight strength of N-methylolacrylamide, and
46 parts of an aqueous solution of 78% by weight strength of methylene - N-acrylamide-N'-β-[dimethylphosphono]-propionamide, and this mixture is then further mixed with a solution of 3.0 parts of sodium bisulfite in 12 parts of water.

Half of the above mixture is introduced in a 500 cc. stirring flask equipped with reflux condenser, thermometer and supply vessel. The batch is heated to an internal temperature of 50° C. A solution of 0.075 part of potassium persulfate in 1.5 parts of water is added, and this addition is repeated when all has been run in and after another 30 minutes. The batch is polymerised for 1 hour at an internal temperature of about 60° C. and then cooled to room temperature.

There are obtained 295 parts of a thinly syrupy emulsion which has a dry content of 33% and a pH value of 4.9. The polymer yield amounts to about 100% of the theoretical.

EXAMPLE 12

(a) 2 parts of a polyester from maleic anhydride and ethyleneglycol (1:1) are homogenised with 1 part of methylene - N - acrylamide-N'-β-[dimethylphosphono]-propionamide in 2 parts of water and the whole is polymerised by adding 1% of benzoyl peroxide.

A stick of wood (cross-section 3 x 8 mm.) is impregnated for 5 minutes with this polymer emulsion and then dried for half an hour at 120° C.

(b) 2 parts of a polyester from maleic anhydride and ethyleneglycol (1:1) are dissolved with 1 part of methylene - N-acrylamide-N'-β-(dimethylphosphono)-propionamide in 1 part of ethyleneglycol and polymerised with 1% of benzoyl peroxide. A stick of wood is impregnated with this polymer emulsion and then dried for ½ hour at 120° C.

(c) The polymer of experiment 2 is mixed in the ratio of 1:1 with a colorless nitrocellulose lacquer and a stick of wood is impregnated with this mixture for 5 minutes and then dried for half an hour at 120° C.

(d) 3 parts of styrene, 5 parts of acrylic acid ethyl ester, 2 parts maleic acid polyester as obtained under (a) above and 1.5 parts of methylene-N-acrylamide-N'-β-(dimethylphosphono)-propionamide are subjected to block polymerisation with benoyl peroxide. Part of the block polymer is then homogenised with an equal amount of water and a stick of wood is impregnated with this mixture for 5 minutes and dried for ½ hour at 120° C.

(e) 2 parts of styrene, 7 parts of ethylacrylate and 1 part of methylene-N-acrylamide-N'-β-(dimethylphosphono)-propionamide are block-polymerised with 1% of benzoyl peroxide. Part of the block polymer is homogenised with an equal amount of water a stick of wood is impregnated with it for 5 minutes and then dried for ½ hour at 120° C.

(f) 3 parts of styrene, 5 parts of ethylacrylate and 2 parts of maleic acid polyester according to (a) are block-polymerised with 1% of benzoyl peroxide. Part of the block polymer is homogenised with an equal amount of water and a stick of wood is impregnated with this mixture for 5 minutes and then dried for ½ hour at 120° C.

(g) 3 parts of methylene-N-acrylamide-N'-β-(dimethylphosphono)-propionamide and 7 parts of methylolacrylamide are block-polymerised in 2 parts of water with 1% of potassium persulfate. Part of the product is homogenised with an equal amount of water and a stick of wood is impregnated with this mixture for 5 minutes and then dried for ½ hour at 120° C.

Testing the flame-stability

The test is carried out with a luminous Bunsen flame 4 cm. high. The stick of wood is immersed to a depth of 2 cm. The block-polymer bead (diameter about 5 mm.) is placed on a spatula and immersed to a depth of 2 cm. The flame is held for 5, 10, 30 and 60 seconds. The resulting values are summarised in the following Table I:

TABLE I

| Experiment No. | Repeated | Flame | | | |
|---|---|---|---|---|---|
| | | 5 secs. | 10 secs. | 30 secs. | 60 secs. |
| (a) Stick | 1× to 5× | Does not burn | Does not burn | Burns, then goes out | No after-glowing. |
| (b) Stick | 1× to 5× | (1) | (1) | (1) | (1) |
| (c) Stick | 1×, 2× | Does not burn | Burns, then goes out | Burns, then goes out after short time. | No after-glowing. |
| | 3× | Burns, then goes out | Goes out after short time | | |
| (d) Stick | 1× to 5× | (1) | (1) | (1) | (1) |
| (d) Bead | 1× to 5× | | | Bead chars completely, but does not burn | |
| (e) Stick | 1× to 5× | (1) | (1) | (1) | (1) |
| (e) Bead | 1× to 5× | (2) | (2) | (2) | (2) |
| (f) Stick | 1× to 5× | | | Burns, then after-glows | |
| (g) Stick | 1× to 5× | Does not burn | Does not burn | Does not burn | Does not burn. |
| (g) Bead | 1× to 5× | | | Bead chars completely, but does not burn | |

1 As in Experiment (a).
2 As in Experiment (d).

EXAMPLE 13

(a) Polyester according to Example 1 of German Patent 1,133,123

62 parts of polyester from 1 part of maleic anhydride, and
1 part of tetrachlorophthalic anhydride and 2,18 parts of glycol,
33 parts of styrene and
5 parts of the methacrylic acid ester of 1-hydroxyethylphosphono-dimethyl ester are polymerised for 1 hour at 100° C. with
1.5 parts of azoisobutyronitrile.

(b) 62 parts of polyester as in Experiment (a),
33 parts of styrene and
5 parts of methylene-N-acrylamide-N'-β-(dimethylphosphono)-propionamide as in Example 1 are polymerised for 1 hour at 100° C. with
1.5 parts of azoisobutyronitrile.

(c) Polyester according to Example 8 of U.S. Patent 2,993,033
12 parts of methylmethacrylate,
6 parts of diethylphosphato-ethylacrylate and
2 parts of methacrylic acid are polymerised for 4 hours at 60° C. with
0.2 part of azoisobutyronitrile.

(d) 12 parts of methylmethocrylate and
6 parts of methylene-N-acrylamide-N'-β-(dimethylphosphono)-propionamide according to Example 1 are polymerised for 4 hours at 60° C. with
2 parts of azoisobutyronitrile.

The testing of the polymers (a) to (d) by the flame-test described in Example 12 yields the results summarised in Table II. The specimens were held in the flame for 5×10 seconds and 1×30 seconds. A 4 cm. high luminous Bunsen flame was used.

TABLE II

|  | Polymer bead | Wood impregnated with polymer | Cotton impregnated with polymer | Filter paper impregnated with polymer |
|---|---|---|---|---|
| Experiment (a): | | | | |
| 1×10 secs | Burns | Burns | Burns | |
| 2×10 secs | | | | |
| 3×10 secs | | | | |
| 4×10 secs | | | | |
| 5×10 secs | | | | |
| 30 secs | | | | |
| Experiment (b): | | | | |
| 1×10 secs | Does not burn | Burns on for 5 secs | Burns | |
| 2×10 secs | do | Burns on for 6 secs | | |
| 3×10 secs | Burns on for 1 sec | Burns | | |
| 4×10 secs | do | | | |
| 5×10 secs | Burns on for 2 secs | | | |
| 30 secs | Burns on for 5 secs | | | |
| Experiment (c): | | | | |
| 1×10 secs | Does not burn | | Burns on for 2 secs | Burns on for 4 secs. |
| 2×10 secs | do | Burns on for 1 sec | Burns on for 5 secs | Burns. |
| 3×10 secs | Burns on for 1 sec | | Burns | |
| 4×10 secs | do | | | |
| 5×10 secs | Burns on for 2 secs | | | |
| 30 secs | Burns on for 5 secs | Chars, burns on for 5 secs | | |
| Experiment (d): | | | | |
| 1×10 secs | | | | |
| 2×10 secs | | | | |
| 3×10 secs | Does not burn | Does not burn | Does not burn. Completely charred after 3×10 secs. | Does not burn. Completely charred after 2×10 secs. |
| 4×10 secs | | | | |
| 5×10 secs | | | | |
| 30 secs | Burns on for 3 secs | Chars, burns on for 2 secs | | |

Experiments (b) and (d), performed with the copolymers of the invention, produced a much better flame-inhibition than the previously known copolymers containing phosphorus.

What is claimed is:

1. A polymerisable compound of the general formula

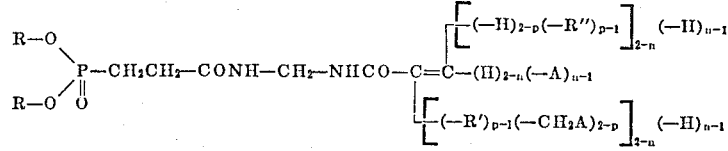

where A represents a member selected from the group consisting of

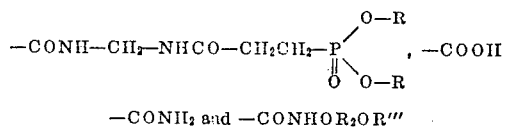

R represents a member selected from the group consisting of an alkyl radical containing 1 to 18 carbon atoms, a cycloalkyl and an aryl radical; R' and R" each represents a member selected from the group consisting of a hydrogen atom and a methyl group; R''' stands for a member selected from the group consisting of hydrogen and an alkyl radical containing 1 to 4 carbon atoms, and $n$ and $p$ each is an integer of at most 2.

2. A polymerisable compound of the formula

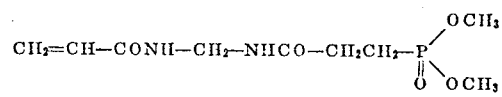

3. A process for the manufacture of linear high polymers, wherein at least one monomer of the general formula

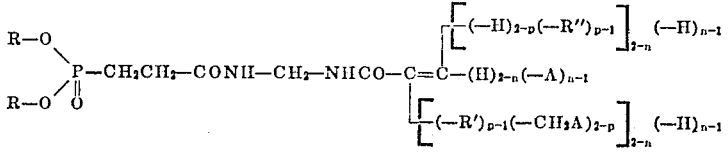

where A represents a member selected from the group consisting of

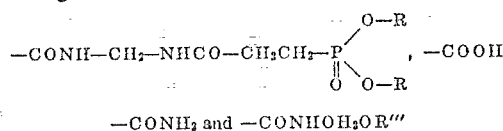

—CONH$_2$ and —CONHOH$_2$OR'''

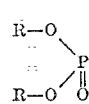

R represents a member selected from the group consisting of an alkyl radical containing 1 to 18 carbon atoms, a cycloalkyl and an aryl radical; R' and R'' each represents member selected from the group consisting of a hydrogen atom and a methyl group; R''' stands for a member selected from the group consisting of hydrogen and an alkyl radical containing 1 to 4 carbon atoms, and $n$ and $p$ each is an integer of at most 2, is polymerised with at least one other polymerisable compound in the presence of a catalyst selected from the class consisting of ionic catalysts and catalysts capable of furnishing free radicals.

4. A process as claimed in claim 3, wherein the other polymerisable compound is a compound selected from the group consisting of vinylchloride, vinylidenechloride, acrylic acid, calcium acrylate, methacrylic acid, fumaric acid, itaconic acid, acrylic acid ethyl ester, methacrylic acid ethyl ester, acrylic acid n-butyl ester, methacrylic acid n-butyl ester, acrylic acid glycidyl ester, acrylic acid monoglycol ester, acrylic acid dodecyl ester, acrylamide, methacrylamide, N-methylolacrylamide, N-methylolacrylamide methyl ether, N-tertiary butylacrylamide, vinyl acetate, acrylonitrile, styrene and butadiene.

5. A process as claimed in claim 3, wherein methylene-N-acrylamide-N'-β-[dimethylphosphono] - propionamide is polymerised.

6. Linear high polymers containing polmerised units of monomers of the general formula

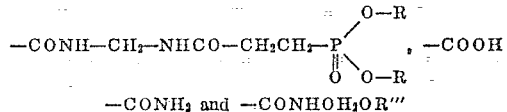

where A represents a member selected from the group consisting of

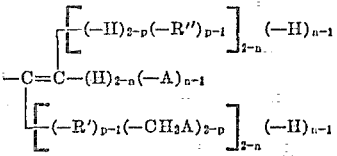

—CONH$_2$ and —CONHOH$_2$OR'''

R represents a member selected from the group consisting of an alkyl radical containing 1 to 18 carbon atoms, a cycloalkyl and an aryl radical; R' and R'' each represents a member selected from the group consisting of a hydrogen atom and a methyl group; R''' stands for a member selected from the group consisting of hydrogen and an alkyl radical containing 1 to 4 carbon atoms, and $n$ and $p$ each is an integer of at most 2.

No references cited.

JOSEPH L. SCHOFER, *Primary Examiner.*

J. KIGHT, *Assistant Examiner.*